US006907354B2

(12) United States Patent
Zhan et al.

(10) Patent No.: US 6,907,354 B2
(45) Date of Patent: Jun. 14, 2005

(54) SYNTHETIC GAS REACTOR SYSTEM WITH GAS OR LIQUID INJECTION

(75) Inventors: Rijing Zhan, San Antonio, TX (US); Thomas R. Gabehart, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 9 days.

(21) Appl. No.: 10/717,372

(22) Filed: Nov. 19, 2003

(65) Prior Publication Data

US 2005/0107973 A1 May 19, 2005

(51) Int. Cl.$^7$ .............................................. G01N 33/00
(52) U.S. Cl. ............................ 702/30; 702/22; 702/23; 702/24; 702/31; 702/32; 422/68.1
(58) Field of Search ......................... 702/22–24, 30–32; 422/68.1, 701, 129, 141, 170, 172, 173, 176–178, 207, 216; 423/571, 572; 208/89, 113, 148, 157, 213; 502/30, 34, 38, 41, 46–48, 50–52; 73/23.35, 23.36, 23.4, 23.41, 23.42

(56) References Cited

U.S. PATENT DOCUMENTS

| | | | | |
|---|---|---|---|---|
| 4,496,666 A | * | 1/1985 | Pesa et al. | 518/706 |
| 4,551,442 A | * | 11/1985 | Pesa et al. | 502/178 |
| 5,352,487 A | * | 10/1994 | Klinedinst et al. | 427/248.1 |
| 5,391,292 A | * | 2/1995 | Schorfheide et al. | 208/140 |
| 5,437,179 A | * | 8/1995 | Wiegand et al. | 73/23.35 |
| 6,192,324 B1 | | 2/2001 | Lambert et al. | 702/183 |
| 6,245,308 B1 | * | 6/2001 | Tokunaga et al. | 423/242.1 |
| 6,308,130 B1 | | 10/2001 | Vojtisek-Lom | 701/114 |
| 6,523,340 B1 | | 2/2003 | Kurihara et al. | 60/274 |
| 2003/0175173 A1 | * | 9/2003 | Karlsson et al. | 422/130 |
| 2004/0202573 A1 | * | 10/2004 | van den Brink et al. | 422/68.1 |

* cited by examiner

Primary Examiner—Carol S. W. Tsai
(74) Attorney, Agent, or Firm—Baker Botts L.L.P.

(57) ABSTRACT

A synthetic gas generator and gas reactor test system. The system is configurable to provide a number of alternative flow paths, each with different furnace and reactor configurations. Various types of reactors, and combinations of two or three reactors, may be installed and tested. Injected agents, such as reducing agents, are injected in a manner that prevents unwanted reactions with the test gas. The system is especially useful for testing vehicle emissions aftertreatment devices.

22 Claims, 3 Drawing Sheets

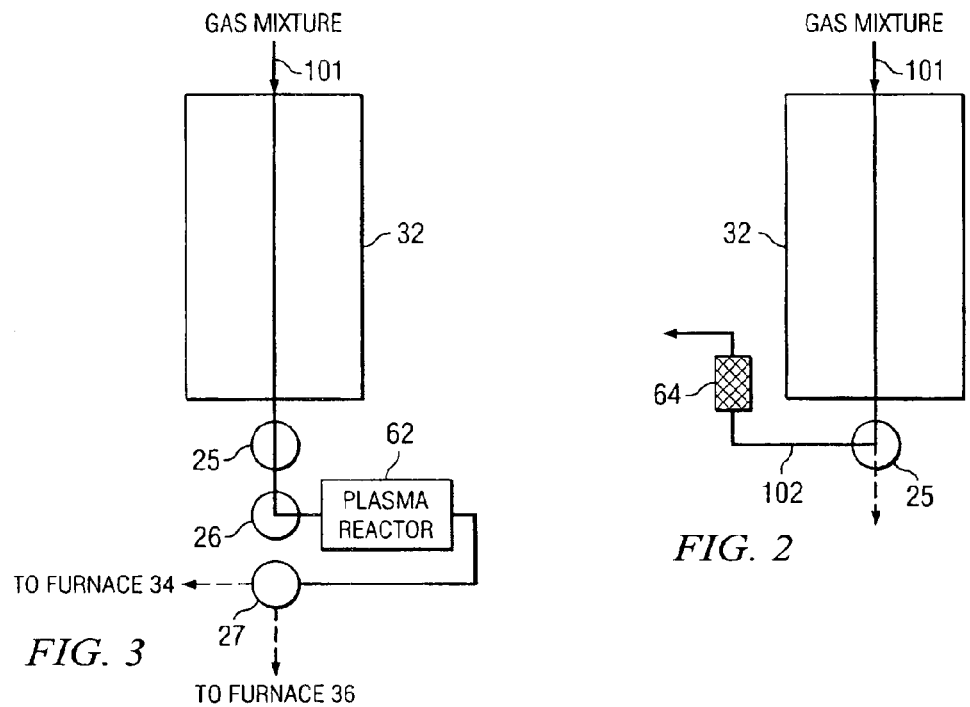
FIG. 3
FIG. 2
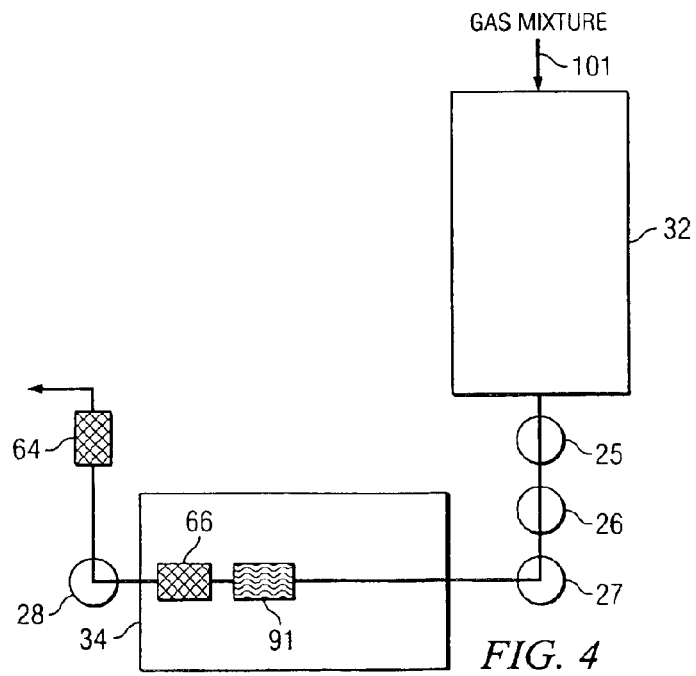
FIG. 4

_US 6,907,354 B2_

SYNTHETIC GAS REACTOR SYSTEM WITH GAS OR LIQUID INJECTION

TECHNICAL FIELD OF THE INVENTION

This invention relates to testing gas reactor devices, such as emissions aftertreatment devices, and methods, and more particularly to a system that tests various combinations of reactor devices using simulated gas mixtures.

BACKGROUND OF THE INVENTION

Emissions from internal combustion engines contribute significantly to the world's air quality problems. Many advances have been made in developing exhaust emissions control ('aftertreatment') devices and systems, using various types of filters, catalysts, and other types of reactors.

For example, many of today's gasoline engines, notably those of motor vehicles, are equipped with catalytic converters for emissions control. For diesel engines, various particulate filters and NOx traps are being developed.

Development and testing of various emissions aftertreatment devices may be performed by using them on actually operating engines, in the field or in a lab. Presently, for vehicle emissions testing, most testing occurs in specialized laboratories, where the vehicle is driven on a dynamo meter according to a prescribed driving cycle, such as I/M 240 or FTP for light and medium duty vehicles and CBD for heavy duty vehicles.

Another approach to testing emissions aftertreatment devices is to simulate the exhaust gas. The devices are then installed on a pipeline through which the simulated exhaust gas flows. The devices may be then subjected to conditions such as heat, to accurately simulate the actual conditions in which the device would operate.

SUMMARY OF THE INVENTION

One aspect of the invention is a system for testing gas reactors. A test gas generator provides at least one test gas into a primary flow line. A first furnace along the primary flow line is operable to heat the test gas. A first reactor location is switchable in and out of the primary gas line. The test gas then reaches an upstream branch valve, which is operable to route the primary flow line to either a first branch line or a second branch line. The first branch line has another furnace and a second reactor within the furnace. The second branch line also has a furnace. A downstream branch valve joins the first branch line and the second branch line, after which the test gas reaches a third reactor location. An injector subsystem inject a gas or liquid into the first branch line upstream the second reactor location.

An advantage of the reactor is that it is configurable to test a variety of techniques, including techniques using different reactor type devices and combinations of these devices. The system may operate based on various user-defined modes, such as rich-lean cycles or high-low temperature cycles.

The system also accurately tests techniques using injected gases or liquid, such as reductants or supplemental fuel. In conventional systems that use simulated gas to test gas reactors, the introduction of high temperatures (over 600 degrees C.) can cause injected components to react before they reach the reactor. In the present invention, an injection subsystem allows gas or liquid injections to the main gas flow without premature reactions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 2–4 each illustrate one of the alternative paths of the gas mixture through the system of FIG. 1.

DETAILED DESCRIPTION OF THE INVENTION

Figure 1:
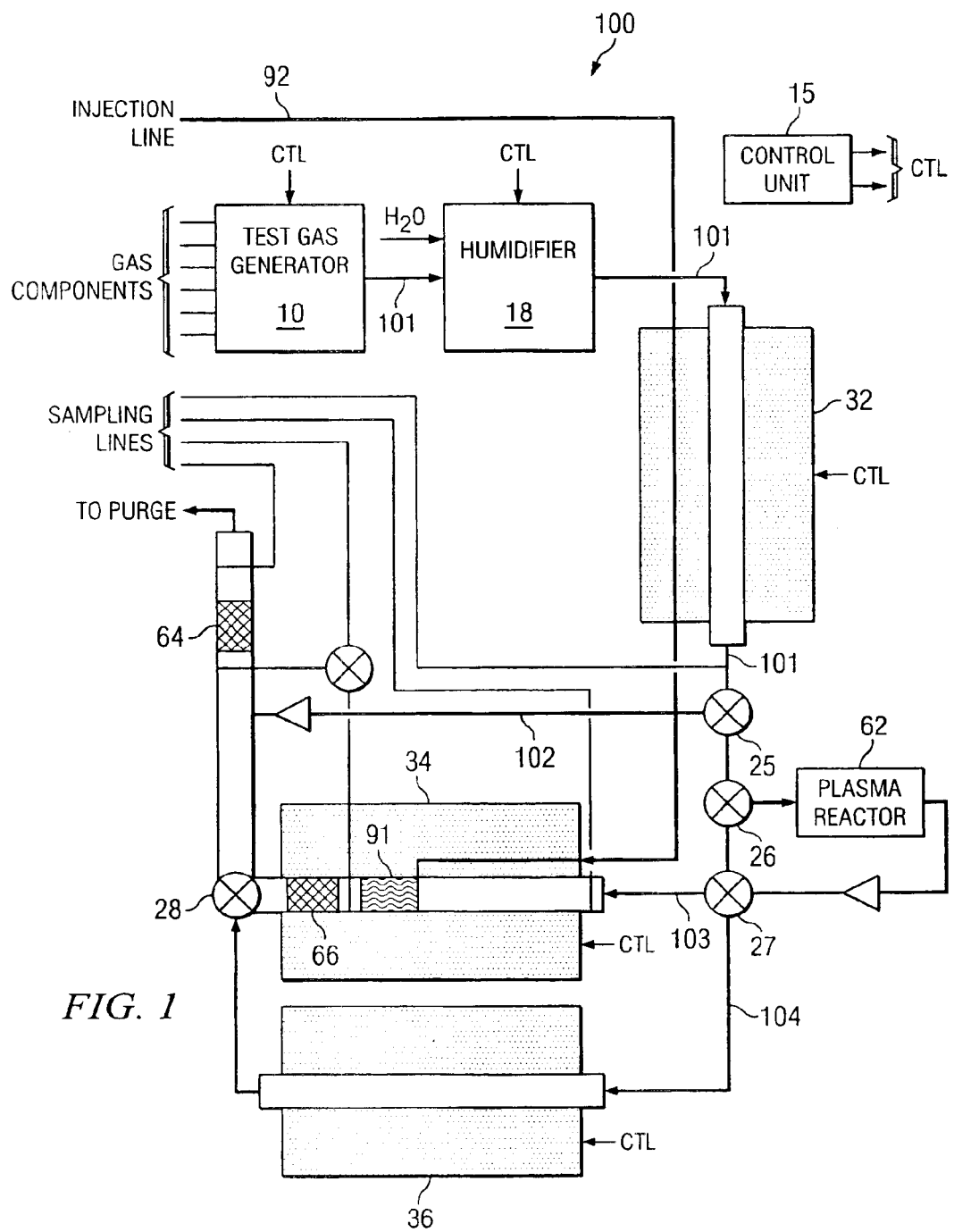
FIG. 1 illustrates a synthetic gas generator and reactor testing system in accordance with the invention.

FIG. 1 illustrates a synthetic gas generator and gas reactor test system 100 in accordance with the invention. As explained below; system 100 generates simulated gas and tests devices that react to the simulated gas (referred to herein as "gas reactors").

The system is especially useful for evaluating emissions control aftertreatment devices and methods, but may be used to test any sort of gas reactor. By permitting a wide range of temperature, humidification, and injection options, as well as different combinations of gas reactor devices, the system may be used to test methodologies as well as to test the devices themselves. The system may be configured (by installing, selectively including, or bypassing) one, two, or three gas reactors at predetermined locations along a gas flow line that carries the simulated gas mixture.

System 100 can be used to test gas phase reactions (such as high temperature gas phase reactions) or gas-solid reactions. In the case of the latter, the solid can be a catalyst or a solid reactant. An example of a gas-solid reaction where the solid is a catalyst is the reaction that occurs with engine exhaust catalysts. An example of a gas-solid reaction where the solid is a solid reactant is a gas scrubbing process, such as those that use lime or limestone to remove SOx from flue gas.

For purposes of this description, system 100 is described in terms of application for exhaust emissions device testing. Aftertreatment devices for both vehicle and stationary engine applications may be tested. The simulated exhaust may simulate exhaust from gasoline or diesel engines, or from an engine using an alternative fuel system, such as natural gas or liquefied petroleum gas. For applications such as these, system 100 may be used to test a variety of aftertreatment devices, such as catalysts, NOx adsorbers, and diesel particulate traps.

A test gas generator 10 provides a desired gas mixture by providing gas components from an array of cylinders (not shown) or other gas supply reservoirs. It incorporates controls for gas input, such as a mass flow controller, and may also incorporate various static or active mixing means. The composition of the gas, the concentration of each gas component, and the gas pressure may be specified for a particular test.

In the example of this description, test gas generator 10 provides simulated exhaust gas. Typical gas components for such testing include, without limitation: nitrogen, carbon dioxide, oxygen, carbon monoxide, hydrogen, nitrogen oxide, and hydrocarbon gases.

In the embodiment of FIG. 1, the components of the synthesized gas mixture are blended by test gas generator 10. However, as explained below in connection with FIG. 6, in alternative embodiments, the gas components from test gas generator 10 may be kept in separate lines at least as far as through furnace 32, and thereafter mixed at some point along the main or branch flow lines.

Controller 15 controls the operation of system 100. It sets all test modes and/or cycles, and controls the operation of the various elements of system 100. More specifically, it may control the operation of test gas generator 10, humidifier 18, furnaces 32, 34, and 36, and the various valves illustrated in FIG. 1. For furnaces 32, 34, and 36 controller 15 may be used to set parameters such as temperatures, rates of increase or decrease, and/or temperature cycle times.

The extent to which controller 15 provides automated control of the elements of system 100 is determined by the sophistication of the programming of controller 15. To this end, controller 15 may be implemented with software-programmable computer equipment, having appropriate processing and memory, operating system, and input and output devices.

The gas mixture from test gas generator 10 is delivered to humidifier 18, which introduces water vapor into the flow line and into the test gas mixture. As illustrated controller 15 may be used to adjust humidification parameters, such as the amount and flow rate of water introduced.

If desired, humidifier 18 may be set to an "off" state by controller 15, such that no water vapor is introduced. In other words, the humidity of the test gas may range from 0% to any desired percentage of the test gas mixture. Some reactors to be tested using system 100 may not require humidification, such as a fuel cell catalyst.

The gas mixture then passes through a first furnace 32, which heats the gas mixture to a desired temperature. To ensure mixing of the gas components, static mixing, such as ceramic chips within the main flow line within furnace 32, may be implemented. In the embodiment of FIG. 1, the flow line passes through furnace 32 but other implementations of a furnace for heating the gas mixture within the flow line are possible.

Three valves 25, 26, and 27 are used to control the flow path of the gas mixture downstream of furnace 32. Valves 25 and 26 are three-way valves (one input port and two output ports). Valve 27 is a four-way valve (two input ports and two output ports).

Depending on how valves 25, 26, and 27 are set, there are several alternative paths for a given gas mixture through system 100. The selection of a particular path depends on the number and types of reactors being tested.

Upstream of valves 25, 26, and 27, the test gas from test gas generator 10 through furnace 32 flows through a "primary" flow line 101. As explained below, downstream of this point, the primary flow line branches into three alternative paths: a bypass line 102, and two branch lines 103 and 104. Valve 25 is referred to herein as a "bypass valve", and is used to route the flow to bypass line 102. Valve 27 is referred to herein as an "upstream branch valve", and routes the flow through either of the two branch lines 103 and 104. Valve 28 is referred to as a "downstream branch valve", and re-joins the flow from the two branch lines 103 and 104.

System 100 has three reactor locations 62, 64, and 66. At each reactor location, system 100 permits installation of a gas reactor. Thus, as used herein, a "reactor location" comprises whatever means are provided on the flow line for installing a reactor, namely an input port, output port, and attachment fittings, such as flanges, threading, or the like. In some embodiments of the invention, the "reactor location" may also comprise means for omitting any reactor at that location. Typically, the attachment fittings further permit interchangeable gas reactors at that location, that is, the fittings are designed for removal of the reactor, so that different types of reactors may be interchanged and tested.

As is clear from the context herein, the identifying numerals 62, 64, and 66 are also sometimes used to refer to whatever type of reactor(s) is installed for a particular test.

As illustrated, it is possible to test the reaction of the gas with any one of three reactors 62, 64, and 66, or any combination of two of these, or all three reactors. It is also possible to omit a reactor at any of the reactor locations, such as when only a plasma reactor at location 62 or only a reactor at location 64 is to be tested, in which case reactors at other locations are omitted. In the absence of a reactor at any location, the test gas simply continues uninterrupted through the flow line.

Reactor location 62 is especially designed for installation of a non thermal plasma reactor. A nonthermal plasma reactor is one in which the mean electron energy, or temperature, is considerably higher than that of the bulk-gas molecules. An example of a non-thermal plasma reactor is the one of the type being developed for reducing NOx emissions in diesel exhaust. The plasma reactor 62 may be any one of a number of plasma-enhanced emission control devices, for example, a lean NOx trap, a selective catalytic reduction device, a lean NOx catalyst, a three way catalyst, or a diesel particulate filter.

Reactors 64 and 66 may be any type of chemical reactor, catalytic or non catalytic. In the vehicular emissions example of this description, examples of reactors that could be tested in locations 64 and 66 are three-way catalysts, oxidation catalysts, NOx reduction catalysts, and selective oxidation catalysts.

FIGS. 2–4 illustrate three possible flow paths and reactor configurations for system 100. System 100 is not limited to these configurations; as explained herein, other reactor combinations or single reactor configurations are possible. After a test procedure is performed using a particular configuration, system 100 may be purged and some other gas mixture and/or some other configuration of flow path and reactors may be tested.

FIG. 2 illustrates a first path through system 100. For this path, valve 25 is set such that the gas mixture bypasses furnaces 34 and 36. The gas mixture flows through reactor 64. This path is typically used when only a single non-plasma type reactor is to be tested.

Referring again to FIG. 1, in alternative configurations, a reactor at location 64 can be switched between inlet temperatures provided by furnace 34 or 36. This is accomplished with manipulation of valves 26 and 27, so as to select the gas mixture path through either furnace prior to reaching catalyst 64.

FIG. 3 illustrates a second path through system 100. For this path, valve 25 is set so that the bypass line 102 is not used. Valve 26 is referred to as the "first reactor valve", and routes the flow either into or past reactor location 62. As stated above, reactor location 62 is especially designed for non thermal plasma reactors, the test gas has passed through furnace 32 to reach a desired temperature, such as an engine exhaust temperature, but reactor 62 is not provided with additional heat.

After passing through plasma reactor 62, the gas mixture reaches valve 27. This valve may be set for either of two paths. A first path carries the gas mixture through furnace 36 and reactor location 64. A second path carries the gas mixture through furnace 34 (and its reactor location 66) and through reactor location 64. If it is desired to test only plasma reactor 62, and no other reactors, one of these paths is used, with no reactor in the reactor location, and the furnace on that path may be turned off.

FIG. 4 illustrates a third path through system 100. For this path, valves 25, 26, and 27 are set such that the gas mixture passes through both reactor 64 and reactor 66. This path is used when two reactors are to be tested. This configuration is especially useful for testing emissions treatment methods that use a pre-catalyst.

Reactor location 66 is also useful for reactors that use an injected reductant or other reactive agent. Reactor 66 is preceded with a static mixer 91, which is used in conjunction with injected components via injection line 92.

Figure 5:
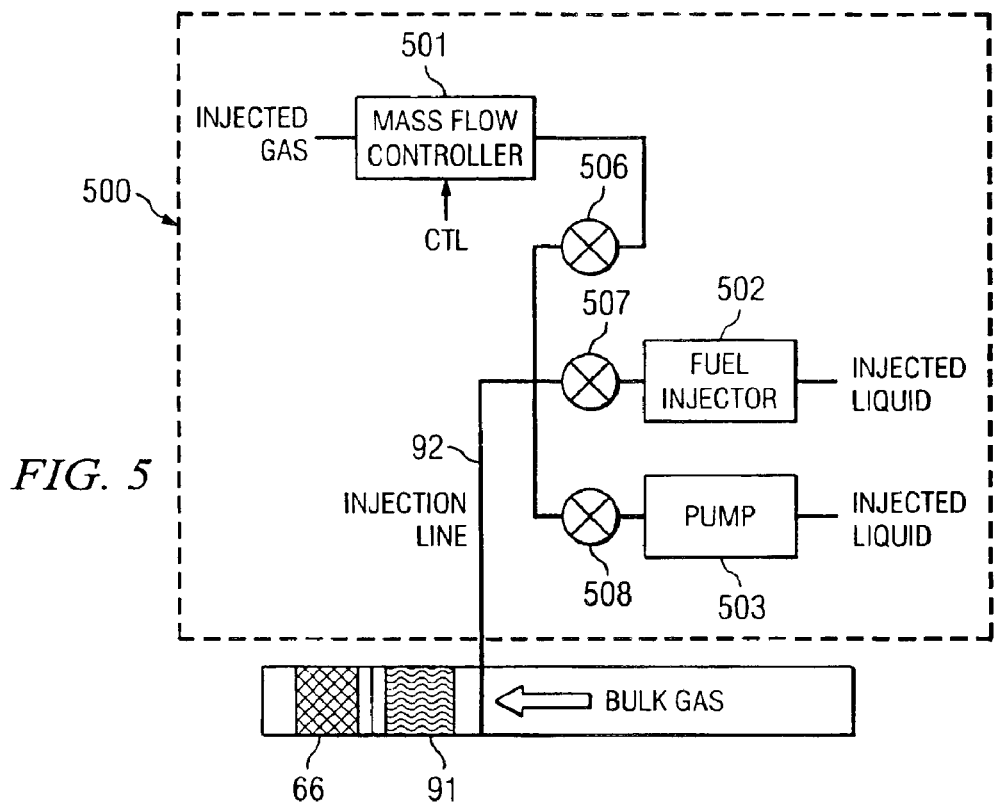
FIG. 5 illustrates an injection subsystem for injecting gas or liquid into the main gas mixture of the system of FIG. 1.

FIG. 5 illustrates one embodiment of an injection subsystem 500, for use with system 100. The separation of injection line 92 from the main gas flow line until just upstream of reactor 66, avoids high-temperature reactions between the injected gas and oxygen and/or gases in the main gas flow line.

Injection system 500 may be used to inject either gaseous or liquid components into the main gas flow line. Examples of gases that might be injected for vehicular emissions applications are hydrocarbon or diesel fuel (such as when reactor 66 is a lean NOx trap or lean NOx catalyst device) or ammonia (such as when reactor 66 is a selective catalytic reductant device).

For injected gases, controller 15 controls the flow rate using a mass flow controller 501. For injected liquids, the flow rate may be controlled using a fuel injector 502 or peristaltic pump 503. In both cases, nitrogen may be used as a carrier gas to introduce the injected gas or liquid into the main gas flow line. Valves 506, 507, and 508 are set to control whether a gas or liquid (pumped or injected) is used.

As stated above, a mixer 91 is used to mix the injected gas or liquid with the gas in the main flow line. Mixer 91 minimizes any unwanted reactions among the gas components before they reach catalyst 66. It ensures a homogeneous gas mixture at the inlet of catalyst 66, and is thus located between catalyst 66 and the injection port for injection line 92 into the main flow line. When injected components are introduced, mixer 91 is designed to fully mix the injected component with the bulk gas in a very short distance. Mixer 91 may be implemented with any one of a number of commercially available static mixer devices. Various types of mixers, static or active, could be used.

As stated above, in the embodiment of FIG. 1, the main (bulk) gas is mixed on exit from test gas generator 10. However, in alternative embodiments, each of the components of the bulk gas, as well as any injected component, could be transported in a separate line until reaching mixer 91.

Figure 6:
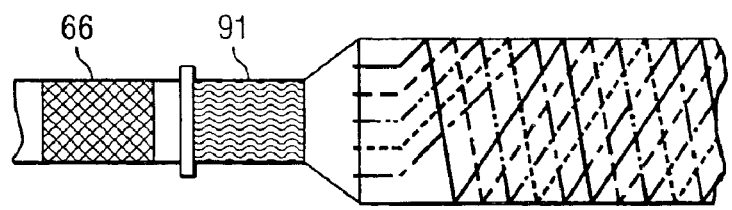
FIG. 6 illustrates the static mixer of FIG. 1.

FIG. 6 illustrates how each gas could be carried in a separate line and mixed at mixer 91. The lines for the individual gases follow the same path from test gas generator 10 to mixer 91. One or more of the lines into mixer 91 may be an injection line. In the example of FIG. 6, test gas generator 10 has five lines, each for providing a different gas. Not all lines need be used, and any different number of lines may be used.

Referring again to FIG. 1, system 100 allows gas sampling at four locations: at the inlet and outlet of reactor 62, at the inlet of reactor 64 or 66, and downstream of reactor 64 and 66. The sample lines may be connected to test equipment, such as an analyzer, FTIR (Fourier transform infrared spectroscopy) equipment, or a spectrometer. Comparative analysis, comparing gas composition before and after each reactor of system 100 enables the operation of the catalyst to be evaluated.

As indicated above, system 100 is capable of simulating the operation of a variety of emissions aftertreatment technologies and permits them to be accurately aged and evaluated. The arrangement of furnaces 32, 34, and 36, and valves 25, 26, 27, and 28 enables a wide range of temperatures and cycling modes.

Controller 15 may be programmed to operate system 100 in various modes or cycles. For example, to evaluate a lean NOx trap, lean-rich cycles are needed to simulate NOx storage and regeneration. To evaluate an selective catalytic reduction catalyst, urea or $NH_3$ injection is needed to activate the catalyst. To evaluate a lean NOx catalyst, a reductant such as gaseous hydrocarbon or diesel fuel, is injected to activate the catalyst. To evaluate a sulfur trap or diesel particulate filter, high-low temperature cycles are needed; the low temperature for trap loading and the high temperature for regeneration. To age a three way catalyst, an aging cycle with different duration of lean, rich, and stoichiometric air-to-fuel ratios is used.

What is claimed is:

1. A system for testing gas reactors, comprising:
   a test gas generator that provides at least one test gas into a primary flow line;
   a first furnace along the primary flow line, operable to heat the test gas;
   a first reactor location, switchable in and out of the primary gas line;
   an upstream branch valve, operable to route the primary flow line to either a first branch line or a second branch line;
   a second furnace on the first branch line;
   a second reactor location positioned to receive thermal output directly from the second furnace;
   a third furnace on the second branch line;
   a downstream branch valve joining the first branch line and the second branch line;
   a third reactor location downstream of the downstream branch valve; and
   an injector subsystem operable to inject a gas or liquid into the first branch line upstream the second reactor location.

2. The system of claim 1, further comprising a bypass line switchable to bypass the gas mixture from a point upstream of the first reactor location to a point downstream of the third reactor location.

3. The system of claim 1, further comprising a humidifier operable to mix water vapor into the test gas.

4. The system of claim 3, wherein the humidifier is located upstream the first furnace.

5. The system of claim 1, further comprising a mixer for mixing the components of the test gas.

6. The system of claim 5, wherein the mixer is located immediately upstream one of the reactor locations.

7. The system of claim 5, wherein the mixer is located immediately upstream the second reactor location.

8. The system of claim 5, wherein the mixer is a static mixer.

9. The system of claim 1, wherein at least one of the reactor locations comprises an input port, output port, and attachment fittings operable for installing a gas reactor.

10. The system of claim 1, further comprising sampling lines for collecting gas samples from the flow line upstream and downstream at least one of the reactor locations.

11. A method of testing gas reactors, comprising the steps of:

providing at least one test gas into a primary flow line;

routing the test gas through a first furnace;

switchably connecting a first reactor to the primary flow line downstream the first furnace, such that the first reactor is switchable in and out of the primary gas line;

routing the gas flow from the first reactor to an upstream branch valve, operable to route the primary flow line to either a first branch line or a second branch line;

wherein the first branch line flows through a second furnace having a second reactor location positioned to receive thermal output directly from the second furnace;

setting the upstream branch valve to select the first branch line;

injecting a gas or liquid into the first branch line upstream the second reactor; and routing the test gas through a downstream branch valve joining the first branch line and the second branch line.

12. The method of claim 11, further comprising the step of connecting a third reactor downstream of the downstream branch valve.

13. The method of claim 11, further comprising the step of mixing the gas immediately downstream the flow line after the injecting step and upstream the second reactor.

14. The method of claim 11, further comprising the step of humidifying the gas mixture upstream the first furnace.

15. The method of claim 11, wherein the method is used to test at least one gas phase reaction.

16. The method of claim 11, wherein the method is used to test at least one gas-solid reaction.

17. The method of claim 16, wherein at least one of the reactors is a catalytic reactor.

18. The method of claim 16, wherein at least one of the reactors is a solid reactor.

19. A method of testing engine exhaust emissions, comprising the steps of:

providing at least one test gas into a primary flow line;

routing the test gas through a first furnace;

switchably connecting a non thermal plasma reactor to the primary flow line downstream the first furnace, such that the non thermal plasma reactor is switchable in and out of the primary gas line;

routing the gas flow from the non thermal plasma reactor to an upstream branch valve, operable to route the primary flow line to either a first branch line or a second branch line;

wherein the first branch line flows through a second furnace having a second reactor positioned to receive thermal output directly from the second furnace;

setting the upstream branch valve to select the first branch line;

injecting a gas or liquid into the first branch line upstream the second reactor; and routing the test gas through a downstream branch valve joining the first branch line and the second branch line.

20. The method of claim 19, further comprising the step of connecting a third reactor downstream of the downstream branch valve.

21. The method of claim 19, further comprising the step of humidifying the gas mixture upstream the first furnace.

22. The method of claim 19, wherein at least one of the second or third reactors is a catalytic reactor.

* * * * *